(12) United States Patent
Ito et al.

(10) Patent No.: US 7,474,191 B2
(45) Date of Patent: Jan. 6, 2009

(54) LAYERED COIL COMPONENT AND METHOD FOR MANUFACTURING THE LAYERED COIL COMPONENT

(75) Inventors: Yoichiro Ito, Echi-gun (JP); Osamu Naito, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 11/863,826

(22) Filed: Sep. 28, 2007

(65) Prior Publication Data

US 2008/0038562 A1 Feb. 14, 2008

Related U.S. Application Data

(63) Continuation of application No. PCT/JP2007/050198, filed on Jan. 11, 2007.

(30) Foreign Application Priority Data

Aug. 8, 2006 (JP) .............................. 2006-215986

(51) Int. Cl.
*H01F 5/00* (2006.01)
(52) U.S. Cl. ........................ 336/200; 336/223; 336/232
(58) Field of Classification Search .................. 336/223, 336/200, 232
See application file for complete search history.

(56) References Cited

U.S. PATENT DOCUMENTS

| | | | | |
|---|---|---|---|---|
| 6,515,568 | B1 * | 2/2003 | Maki et al. | ................... 336/200 |
| 6,853,267 | B2 * | 2/2005 | Chiba et al. | ................. 333/185 |
| 7,069,639 | B2 * | 7/2006 | Choi et al. | ................. 29/602.1 |
| 7,221,250 | B2 * | 5/2007 | Yoshida et al. | .............. 336/200 |
| 7,304,557 | B2 * | 12/2007 | Tsuzuki et al. | .............. 336/200 |

FOREIGN PATENT DOCUMENTS

| | | |
|---|---|---|
| JP | 56-155516 A | 12/1981 |
| JP | 1-35483 B2 | 7/1989 |
| JP | 2005-093971 A | 4/2005 |
| JP | 2006-261577 A | 9/2006 |

OTHER PUBLICATIONS

Official communication issued in the International Application No. PCT/JP2007/050198, mailed on Apr. 24, 2007.

* cited by examiner

*Primary Examiner*—Anh T Mai
(74) *Attorney, Agent, or Firm*—Keating & Bennett, LLP

(57) ABSTRACT

A layered coil component includes a coil that is constructed by layering coil conductor patterns and ceramic sheets. The ceramic sheets include a first ceramic sheet and a third ceramic sheet having a permeability lower than the permeability of the first ceramic sheet. The third ceramic sheet has an arrangement that is astride at least two of the coil conductor patterns adjacent to each other in a layering direction, in a section including a coil axis of the coil. As a result, DC bias characteristics of the open magnetic circuit type layered coil component are improved.

8 Claims, 7 Drawing Sheets

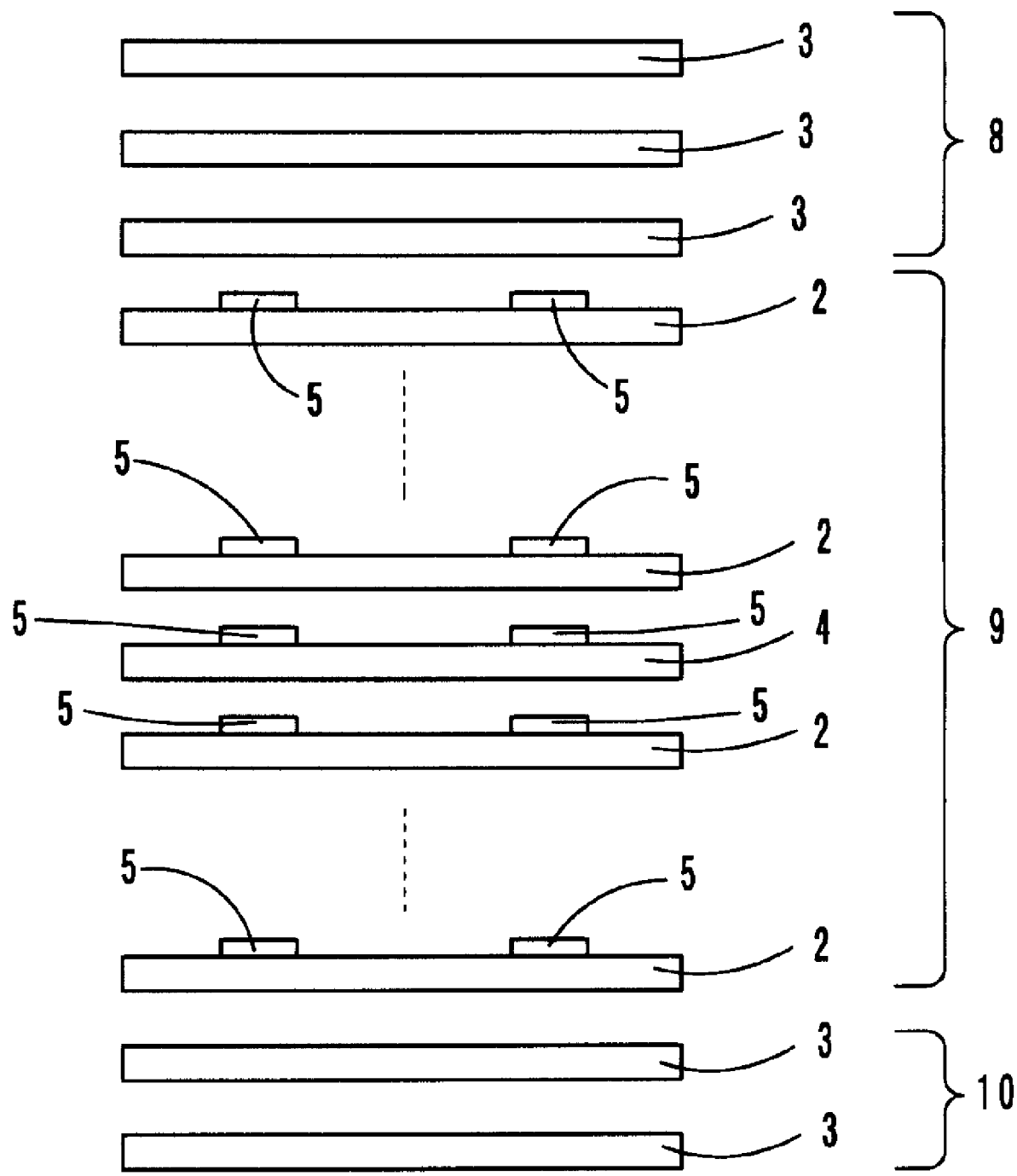

LAYERED COIL COMPONENT AND METHOD FOR MANUFACTURING THE LAYERED COIL COMPONENT

BACKGROUND OF THE INVENTION

1. Field of the Invention

The present invention relates to a layered coil component. In particular, the present invention relates to a layered coil component including a coil formed by layering electrically conductive members and insulating layers and a method for manufacturing the layered coil component.

2. Description of the Related Art

For example, a layered coil component to be used for a DC-DC converter is required to have good DC bias characteristics in order to prevent reduction in the conversion efficiency of current to magnetic energy due to reduction in inductance resulting from magnetic saturation.

An open magnetic circuit type layered coil component described in Japanese Examined Patent Application Publication No. 1-35483 has been known as a layered coil component that improves the DC bias characteristics. As shown in FIG. 14, the layered coil component 101 has a structure in which a nonmagnetic layer 104 is disposed between magnetic layers 102. Since the nonmagnetic layer 104 is disposed between the magnetic layers 102, the magnetic resistance of the magnetic paths $\phi'1$ formed around a coil L is increased in the nonmagnetic layer 104, and a magnetic flux leaks from the nonmagnetic layer 104. As a result, the magnetic flux density is prevented from becoming excessively increased in the nonmagnetic layer 104, so that magnetic saturation becomes resistant to occurrence and sharp reduction in the inductance due to the magnetic saturation is suppressed. That is, the DC bias characteristics of the layered coil component 101 are improved.

However, with respect to the layered coil component 101 shown in FIG. 14, the DC bias characteristics cannot be improved satisfactorily. The reason will be described below.

As described above, the magnetic resistance of the magnetic path $\phi'1$ is increased in the nonmagnetic layer 104. When the magnetic resistance is increased, as shown in FIG. 14, short magnetic paths $\phi'2$ are generated so as to avoid the nonmagnetic layer 104. Since the magnetic paths $\phi'2$ are closed magnetic circuits, a leakage of magnetic flux on the magnetic paths $\phi'2$ is made difficult. Consequently, even when the DC bias current is relatively small, the magnetic density becomes excessively increased and the magnetic saturation may occur.

SUMMARY OF THE INVENTION

In order to overcome the problems described above, preferred embodiments of the present invention provide an open magnetic circuit type layered coil component capable of improving the DC bias characteristics and a method for manufacturing the layered coil component.

A layered coil component according to a preferred embodiment of the present invention includes a coil that is constructed by layering electrically conductive members and insulating layers, wherein the insulating layers include a first insulating layer and a second insulating layer having a permeability lower than the permeability of the first insulating layer, and in a section including a coil axis of the coil, the second insulating layer has an arrangement that is astride at least two of the electrically conductive members adjacent to each other in a layering direction. Consequently, the electrically conductive members straddled by the second insulating layer do not contribute to formation of a closed magnetic circuit. As a result, the magnetic flux of the closed magnetic circuit is decreased and it is quite difficult for magnetic saturation to occur, so that the DC bias characteristics of the layered coil component are improved.

In the layered coil component according to a preferred embodiment of the present invention, preferably, in the section including the coil axis, the second insulating layer has an arrangement that is separately astride electrically conductive members disposed in two rows in a layering direction. Consequently, the electrically conductive members disposed in each row are enclosed by the second insulating layer separately from the other row. Therefore, the periphery of the electrically conductive member is widely covered with the second insulating layer as compared with that in the shape in which the electrically conductive members in two rows are straddled collectively. As a result, the enclosed electrically conductive members do not contribute to formation of a closed magnetic circuit, so that the DC bias characteristics are improved.

In the layered coil component according to a preferred embodiment of the present invention, the second insulating layer may be a nonmagnetic layer.

In the layered coil component according to a preferred embodiment of the present invention, the second insulating layer may be bent at a portion that is astride the electrically conductive member.

In the layered coil component according to a preferred embodiment of the present invention, preferably, the electrically conductive member is bent in the same direction as the bending direction of the second insulating layer. When the electrically conductive member is bent, the magnetic resistance in the periphery of the electrically conductive member is increased and, thereby, a magnetic flux that goes around the entire coil tends to be generated as compared with a magnetic flux that goes around each of the electrically conductive members.

In the layered coil component according to a preferred embodiment of the present invention, in the section including the coil axis, preferably, the electrically conductive member has a shape in which the thicknesses of both end portions in a direction that is substantially perpendicular to the coil axis are smaller than the thickness of a center portion.

In the layered coil component according to a preferred embodiment of the present invention, preferably, in the layers above a predetermined intermediate layer of the insulating layers, the electrically conductive members are bent so as to protrude toward an upper layer side, and in the layers below the predetermined intermediate layer of the insulating layers, the electrically conductive members are bent so as to protrude toward the lower layer side. According to the layered coil component having such a configuration, the electrically conductive member located at an uppermost layer side in the layering direction has a bent structure that protrudes upward, and the electrically conductive member located at a lowermost layer side in the layering direction has a bent structure that protrudes downward. Consequently, the layered coil component has a structure in which the corners of the electrically conductive member located at an uppermost position and the corners of the electrically conductive member located at a lowermost position are rounded. Therefore, with respect to the layered coil component according to a preferred embodiment of the present invention, the magnetic path can pass the portions where the corners of the electrically conductive members were present originally, and thereby, the length of the magnetic path is decreased as compared with that of the layered coil component including electrically conductive members that are not bent. As a result, the magnetic flux of the layered coil component can be increased and the inductance of the layered coil component can be increased.

In the layered coil component according to a preferred embodiment of the present invention, a plurality of second insulating layers may be disposed.

A layered coil component according to a preferred embodiment of the present invention can be produced by the following manufacturing method. Specifically, a method for manufacturing a layered coil component incorporating a coil disposed by layering an electrically conductive members and insulating layers includes the steps of (a) layering a first insulating layer and a second insulating layer having a permeability lower than the permeability of the first insulating layer so as to form a layered product, and (b) press-bonding the layered product with an elastic member to form the second insulating layer into an arrangement astride at least two of the electrically conductive members adjacent to each other in a layering direction, in a section including a coil axis of the coil. According to this manufacturing method, a layered coil component can be produced favorably.

According to various preferred embodiments of the present invention, the electrically conductive members straddled by the second insulating layer do not contribute to formation of a closed magnetic circuit. Consequently, it is difficult for the magnetic saturation to occur, so that the DC bias characteristics of the layered coil component are improved.

Other features, elements, steps, characteristics and advantages of the present invention will be described below with reference to preferred embodiments thereof and the attached drawings.

BRIEF DESCRIPTION OF THE DRAWINGS

FIG. 2 is a sectional view showing a step in a process for manufacturing the layered coil component according to the first preferred embodiment of the present invention.

DETAILED DESCRIPTION OF PREFERRED EMBODIMENTS

Preferred embodiments of an open magnetic circuit type layered coil component and a method for manufacturing the layered coil component according to the present invention will be described below with reference to the drawings. FIGS. 2 to 4, FIGS. 6 to 8, and FIGS. 10 to 13 are sectional views, but hatching is omitted for purposes of brevity and clarity of illustration. Each preferred embodiment described herein is an example of the case where a single product is produced. However, in the case of mass production, many coil conductor patterns are printed on a surface of a mother ceramic sheet, and a plurality of the resulting mother ceramic sheets are layered and press-bonded so as to form an unfired layered product block. The layered product block is cut with a dicer or the like in accordance with the arrangement of a coil conductor pattern so as to prepare individual layered ceramic chips by cutting. The resulting layered ceramic chips are fired and external electrodes are formed on the fired layered ceramic chips, so that layered coil components are produced. Alternatively, the mother ceramic sheets may be layered, press-bonded, and fired. Thereafter, the resulting layered product may be cut into individual layered ceramic chips.

First Preferred Embodiment

Figure 1:
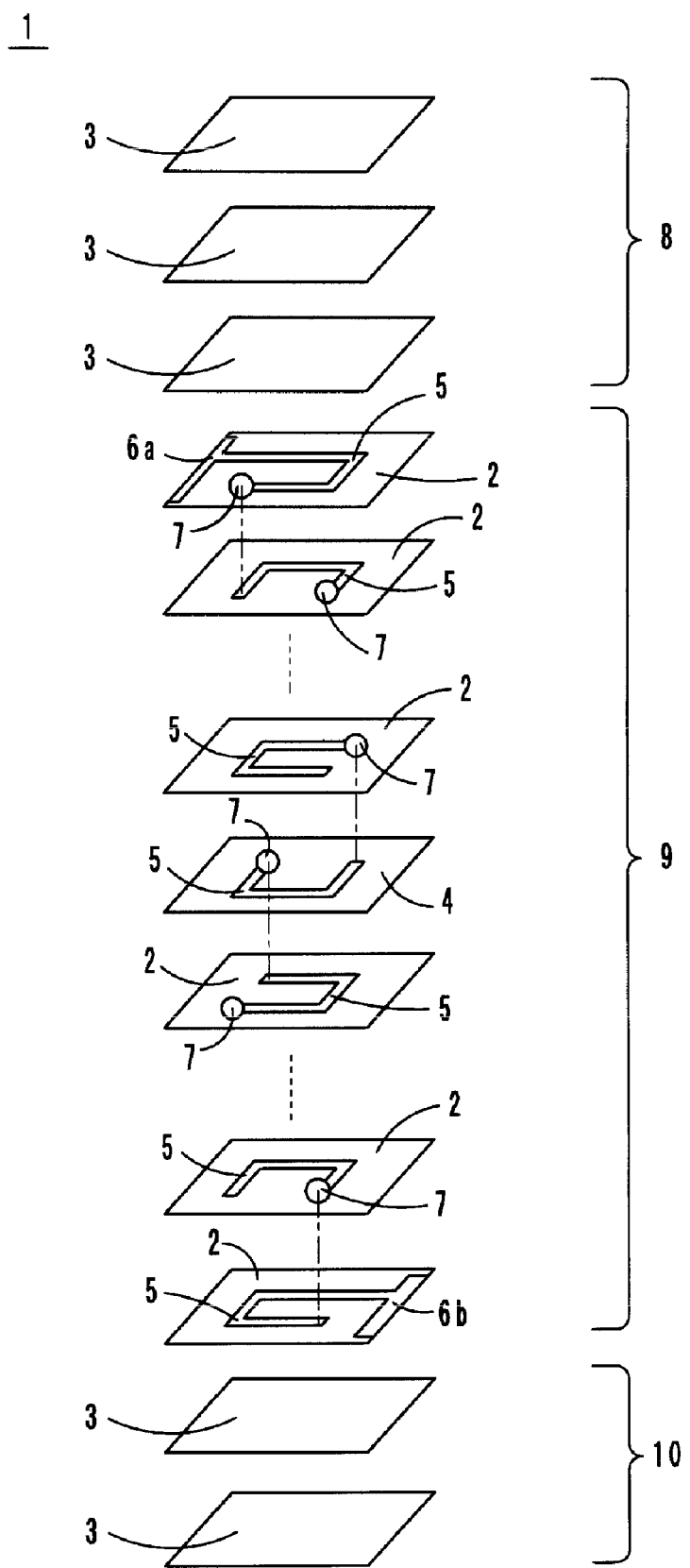
FIG. 1 is an exploded perspective view of a layered coil component according to a first preferred embodiment of the present invention.

FIG. 1 is an exploded perspective view of a layered coil component 1 according to the first preferred embodiment of the present invention. As shown in FIG. 1, a layered coil component 1 preferably includes first ceramic sheets 2, second ceramic sheets 3, a third ceramic sheet 4, and the like.

The first ceramic sheet 2 is formed from a magnetic material, and a coil conductor pattern 5 and a via hole conductor 7 are disposed on a principal surface thereof. The second ceramic sheet 3 is formed from a magnetic material similarly to the first ceramic sheet 2, and no coil conductor pattern 5 is disposed on a principal surface thereof. The third ceramic sheet 4 is formed from a low-permeability material having a permeability lower than the permeability of the first ceramic sheet 2 or a nonmagnetic material (having a permeability of 1), and a coil conductor pattern 5 and a via hole conductor 7 are disposed on a principal surface thereof.

The first ceramic sheet 2 and the second ceramic sheet 3 are produced according to the following process as an example of one method of the present invention. Each material is weighed in such a way as to constitute a raw material composed of, for example, about 48.0 mole percent of ferric oxide ($Fe_2O_3$), about 25.0 mole percent of zinc oxide (ZnO), about 18.0 mole percent of nickel oxide (NiO), and about 9.0 mole percent of copper oxide (CuO), and is put into a ball mill, followed by wet formulation. The resulting mixture is dried and milled, and the resulting powder is calcined at approximately 750° C. for about 1 hour. The resulting calcined powder is wet-milled in a ball mill, dried, and thereafter, disintegrated so as to produce a ferrite ceramic powder.

A binder (vinyl acetate, water-soluble acryl, or other suitable material), a plasticizer, a humectant, and a dispersant are added to the ferrite ceramic powder, followed by mixing in a ball mill. Thereafter, defoaming is performed by reducing a pressure. The resulting ceramic slurry is formed into a sheet by a doctor blade method, and is dried so as to prepare the first ceramic sheet 2 and the second ceramic sheet 3, each having a predetermined thickness.

The third ceramic sheet 4 is produced as described below. Each material is weighed in such a way as to constitute a raw material composed of, for example, about 48.0 mole percent of ferric oxide ($Fe_2O_3$), about 43.0 mole percent of zinc oxide (ZnO), and about 9.0 mole percent of copper oxide (CuO), and is put into a ball mill, followed by wet formulation. The resulting mixture is dried and milled, and the resulting powder is calcined at approximately 750° C. for about 1 hour. The resulting calcined powder is wet-milled in a ball mill, dried, and thereafter, disintegrated so as to produce a nonmagnetic ceramic powder.

A binder (vinyl acetate, water-soluble acryl, or other suitable material), a plasticizer, a humectant, and a dispersant are added to the nonmagnetic ceramic powder, followed by mixing in a ball mill. Thereafter, defoaming is performed by reducing a pressure. The resulting ceramic slurry is formed into a sheet by a doctor blade method, and is dried so as to prepare the third ceramic sheet 4 having a predetermined thickness.

Each of the first ceramic sheet 2 and the third ceramic sheet 4 are provided with a via hole conductor 7 to connect the coil conductor patterns 5 of adjacent layers. The via hole conductor 7 is formed by forming a through hole in the first ceramic sheet 2 and the third ceramic sheet 4 with a laser beam or the like and filling the resulting through hole with an electrically conductive paste of Ag, Pd, Cu, Au, an alloy thereof, or the like by a method, e.g., coating through printing.

A coil conductor pattern 5 is formed on each of the first ceramic sheet 2 and the third ceramic sheet 4 by applying the electrically conductive paste by a method, e.g., a screen printing method or photolithography. These conductor patterns 5 are preferably formed from Ag, Pd, Cu, Au, an alloy thereof, or other suitable material.

A plurality of coil conductor patterns 5 are electrically connected in series through via hole conductors 7 disposed in the first ceramic sheet 2 and the third ceramic sheet 4 so as to form a spiral coil L. The coil axis of the coil L is parallel or substantially parallel to a layering direction of the first ceramic sheet 2, the second ceramic sheet 3, and the third ceramic sheet 4. Lead portions 6a and 6b of the coil L are exposed at a left-hand side of the first ceramic sheet 2 disposed as an uppermost layer and a right-hand side of the first ceramic sheet 2 disposed as a lowermost layer, respectively, among the plurality of first ceramic sheets 2.

As shown in FIG. 1, the second ceramic sheets 3, the first ceramic sheets 2, the third ceramic sheet 4, the first ceramic sheets 2, and the second ceramic sheets 3 are sequentially layered from the bottom. At this time, the third ceramic sheet 4 is layered so as to be located nearly at the center in the length direction of the coil axis. The first ceramic sheets 2, the second ceramic sheets 3, and the third ceramic sheet 4 are press-bonded. A press-bonding step will be described below with reference to FIG. 2 to FIG. 4. FIG. 2 to FIG. 4 are sectional structural views of a section including a coil axis of the coil, showing a process for manufacturing the layered coil component 1.

A predetermined number of the first ceramic sheets 2, the second ceramic sheets 3, and the third ceramic sheet 4 are layered. At this time, as shown in FIG. 2, coil conductor patterns 5 formed on the first ceramic sheets 2 and the third ceramic sheet 4 are arranged such that the coil conductor patterns seem to be stacked on top of each other in a plan view when viewed from above in the layering direction.

Figure 3A:
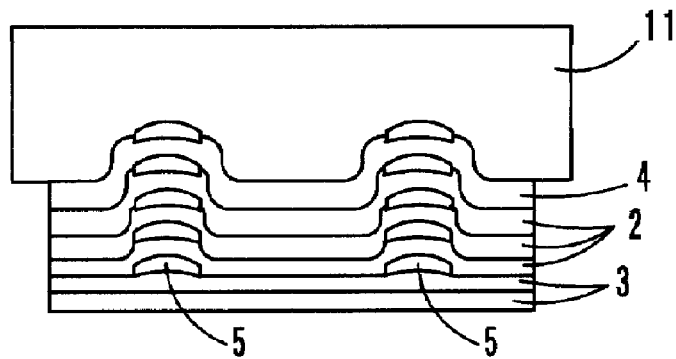
FIGS. 3A and 3B are sectional views showing steps in a process for manufacturing the layered coil component according to the first preferred embodiment of the present invention.
Figure 4:
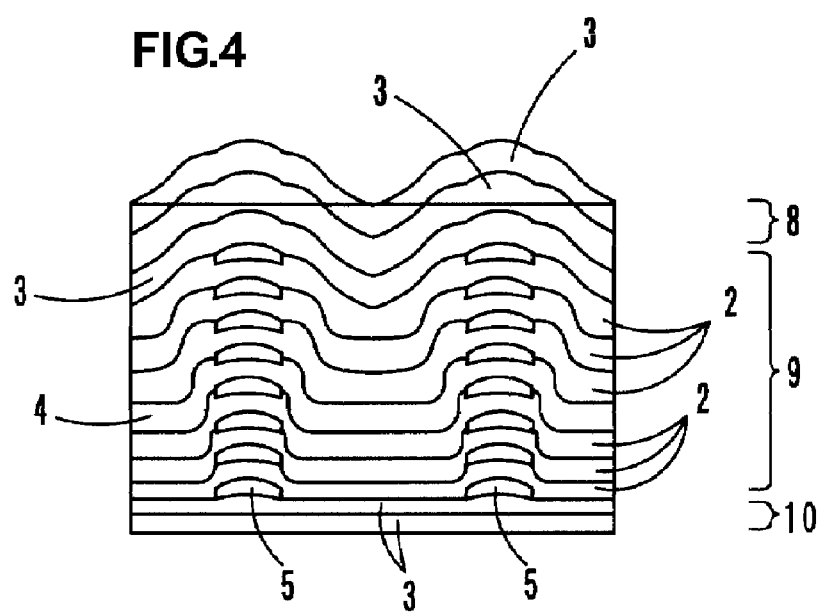
FIG. 4 is a sectional view showing a step in a process for manufacturing the layered coil component according to the first preferred embodiment of the present invention.

Subsequently, as shown in FIG. 3A, press bonding is performed from above in the layering direction. For example, the press bonding is performed by pressing a press-bonding mold with an easy-to-deform material 11, e.g., rubber, affixed on a press-bonding surface against the third ceramic sheet 4 disposed as the uppermost layer in the layering direction under the conditions of approximately 45° C. and about 1.0 t/cm2.

FIG. 3A shows a form in which six sheets including the first ceramic sheets 2, the second ceramic sheets 3, and the third ceramic sheet 4 disposed sequentially from the bottom are press-bonded simultaneously. However, the sheets may be press-bonded sequentially on a one-by-one basis, or be press-bonded sequentially by two or three sheets. This is also true of the press-bonding step shown in FIG. 3B as well.

Figure 3B:
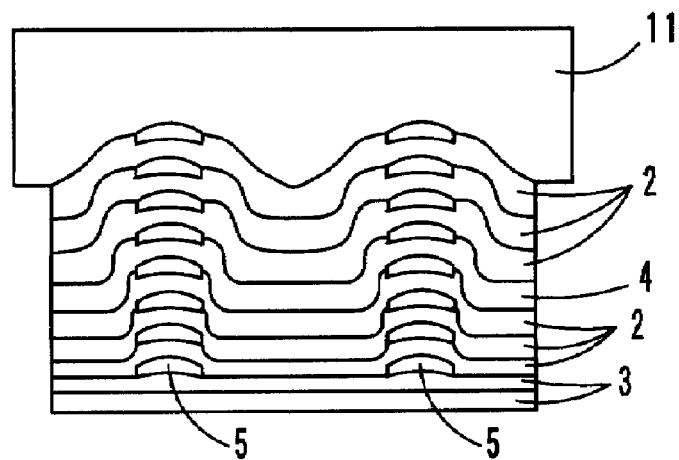

A predetermined number of the first ceramic sheets 2 are layered on the third ceramic sheet 4. Thereafter, as shown in FIG. 3B, press bonding is performed from above in the layering direction. According to this, as shown in FIG. 3B, regions other than the regions where the coil conductor patterns 5 have been disposed are compressed in the layering direction to a relatively large extent. On the other hand, the regions where the coil conductor patterns 5 have been disposed are compressed in the layering direction to a relatively small extent because the coil conductor patterns 5 resistant to compression are present. As a result, as shown in FIG. 3B, the third ceramic sheet 4 takes on an arrangement astride at least two of the coil conductor patterns 5 adjacent to each other in a layering direction. More specifically, in a section including the coil axis, the third ceramic sheet 4 takes on a shape that is bent (protruded) upward in the layering direction in two regions where the coil conductor patterns 5 are disposed, while each of the bent (protruded) portions includes at least two layers of coil conductor patterns 5.

As described above, the coil conductor patterns 5 are formed on the first ceramic sheet 2 and the third ceramic sheet 4 by screen printing. In this screen printing, the coil conductor pattern 5 takes on an arrangement in which the thicknesses of both end portions in a direction that is substantially perpendicular to the coil axis of the coil L are smaller than the thickness of a center portion. When a pressure is applied to the coil conductor pattern 5 having such a shape during the press bonding, as shown in FIG. 3B, the coil conductor pattern 5 takes on a shape that is bent in the same direction (upward in the layering direction) as that of the above-described third ceramic sheet 4. This is because the center portion of the coil conductor pattern 5 has a large thickness and, therefore, is applied with a repulsive force so as to be pushed up by the coil conductor pattern 5 located thereunder and both end portions of the coil conductor pattern 5 have small thicknesses and, therefore, are applied with a force from above so as to be pressed down during press bonding.

After the step of layering and press-bonding the first ceramic sheets 2, the second ceramic sheets 3, and the third ceramic sheet 4 on a predetermined number of layers basis, is completed, the second ceramic sheets 3 are layered, and press bonding is performed by using the above-described easy-to-deform material 11. Consequently, a layered product having convex portions on the top surface, as shown in FIG. 4, is formed. Finally, the convex portions on the top surface of this layered product are removed by a method of cutting or the like, so that the top surface of the layered product is smoothed. In this manner, an unfired layered product is formed.

Figure 5:
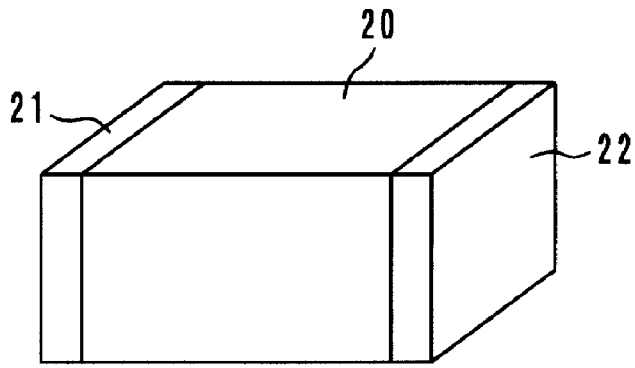
FIG. 5 is an external perspective view of the layered coil component according to the first preferred embodiment of the present invention.

The resulting unfired layered product is subjected to a binder removal treatment and firing. For example, the binder removal treatment is performed by heating at approximately 500° C. for about 120 minutes in a low-oxygen atmosphere. The firing is performed by heating at approximately 890° C. for about 150 minutes in an air atmosphere. According to this method, a layered product 20 having a substantially rectangular shape, as shown in FIG. 5, is produced. FIG. 5 is an external perspective view of the layered coil component 1. A surface of the layered product 20 is coated with an electrode paste primarily containing silver by, for example, a dipping method. The electrode paste is dried at approximately 100° C. for about 10 minutes. Thereafter, the coating film is baked at approximately 780° C. for about 150 minutes so as to form input/output external electrodes 21 and 22. As shown in FIG. 5, the input/output external electrodes 21 and 22 are disposed on left-hand side and right-hand side end surfaces, respectively, of the layered product 20. The lead portions 6a and 6b of the coil L are electrically connected to the input/output external electrodes 21 and 22, respectively.

Figure 6:
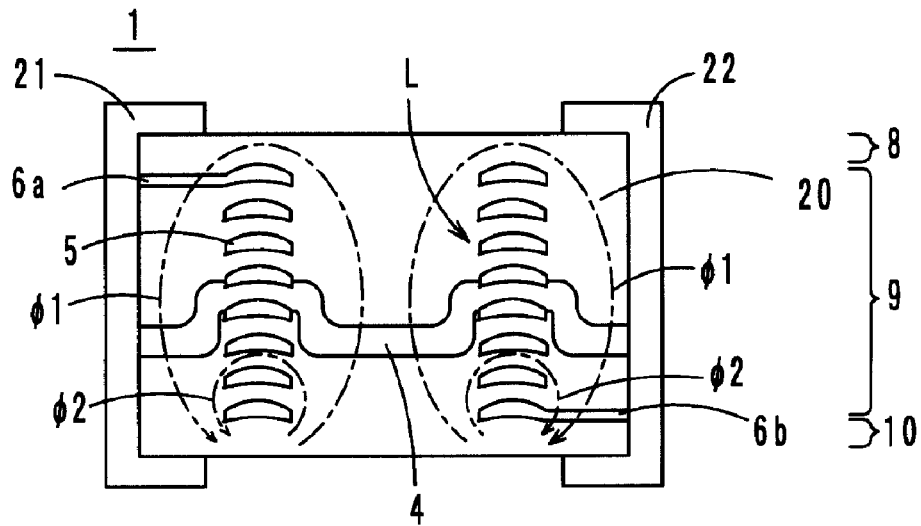
FIG. 6 is a sectional structural diagram of a section including a coil axis of the layered coil component according to the first preferred embodiment of the present invention.

As shown in the sectional views in FIG. 4 and FIG. 6, the thus produced layered coil component 1 includes a coil portion 9 incorporated with the coil L constructed by electrically connecting a plurality of coil conductor patterns 5 and outer layer portions 8 and 10 layered on the top and bottom regions of the coil portion 9. The third ceramic sheet 4 is disposed nearly at the center position of the coil portion 9 in the layering direction of the layered coil component 1. The number of turns of one layer of the coil conductor pattern 5 preferably is three-quarters of a turn and 8.5 turns of coil L are provided. The thickness of the coil conductor pattern 5 preferably is about 20 µm, the thickness of the third ceramic sheet 4 preferably is about 35 µm, and the thickness between the coil conductor patterns 5 preferably is about 14 µm, for example. The dimension of the chip preferably is approximately 2.0 mm×1.2 mm×1.2 mm, for example.

According to the layered coil component 1 having the above-described configuration, an occurrence of magnetic saturation is prevented and, therefore, the DC bias characteristics are improved. Detailed explanations will be provided below with reference to FIG. 6 and FIG. 14.

Figure 14:
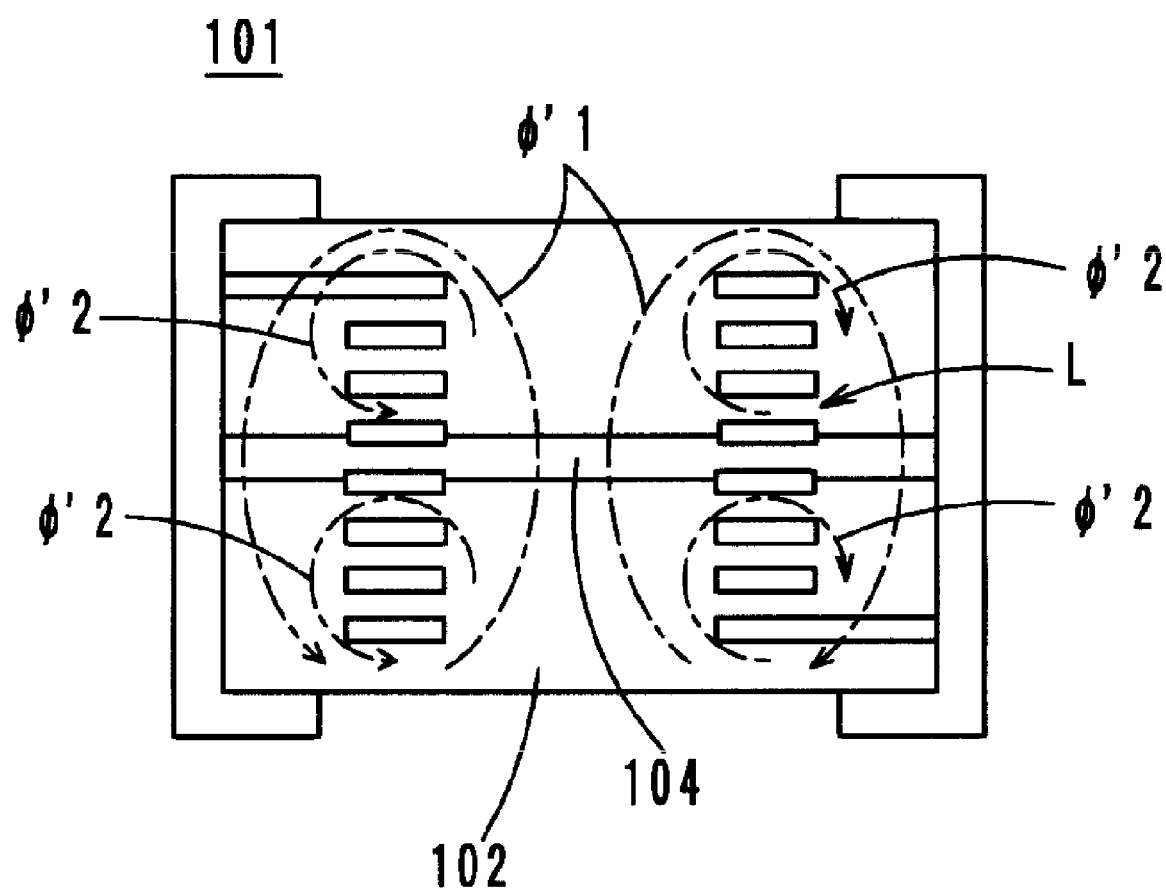
FIG. 14 is a sectional structural diagram of a known layered coil component.

In a known layered coil component 101 shown in FIG. 14, three layers of coil conductor patterns are present in the magnetic layers 102 under a nonmagnetic layer 104. Therefore, three layers of coil conductor patterns contribute to formation of a magnetic path $\phi'2$ that is a closed magnetic circuit.

On the other hand, in the layered coil component 1, as shown in FIG. 6, the third ceramic sheet 4 has an arrangement that is astride at least two of the coil conductor patterns 5 adjacent to each other in the layering direction. Since coil conductor patterns 5 straddled by the third ceramic sheet 4 do not contribute to formation of a magnetic path $\phi2$ that is a closed magnetic circuit, only two layers of coil conductor patterns 5 contribute to formation of the magnetic path $\phi2$. Therefore, when a DC bias current is passed through the layered coil component 1 and the layered coil component 101 under the same condition, the magnetic flux of the magnetic path $\phi2$ of the layered coil component 1 becomes less than that of the layered coil component 101. As a result, the layered coil component 1 is resistant to the occurrence of magnetic saturation and exhibits good DC bias characteristics as compared with the layered coil component 101.

Figure 8:
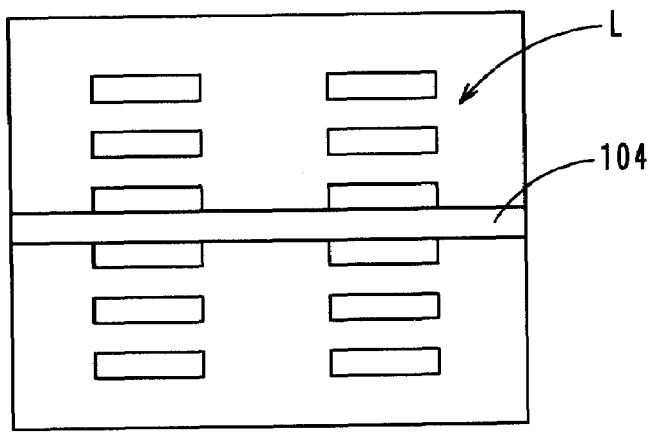
FIG. 8 is a sectional structural diagram of an analytic model of a layered coil component according to Comparative example.
Figure 9:
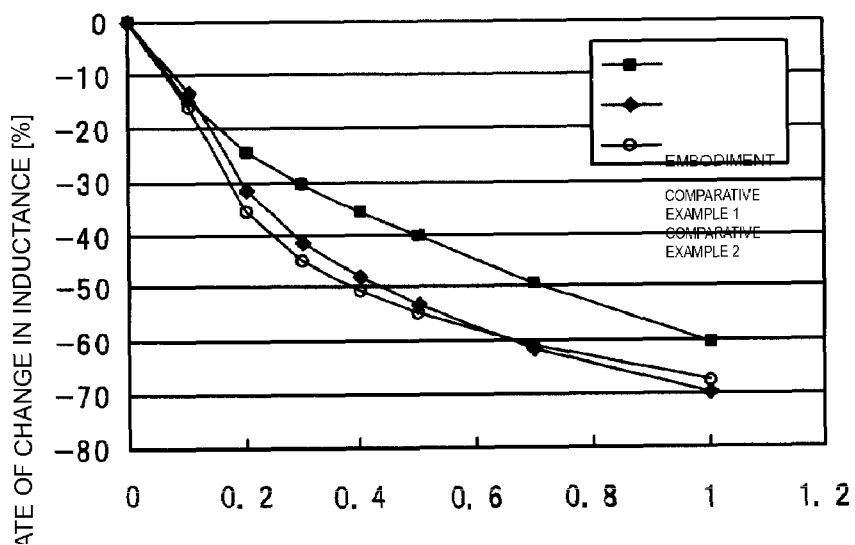
FIG. 9 is a graph showing the relationship between the DC bias current and the rate of change in inductance.
Figure 10:
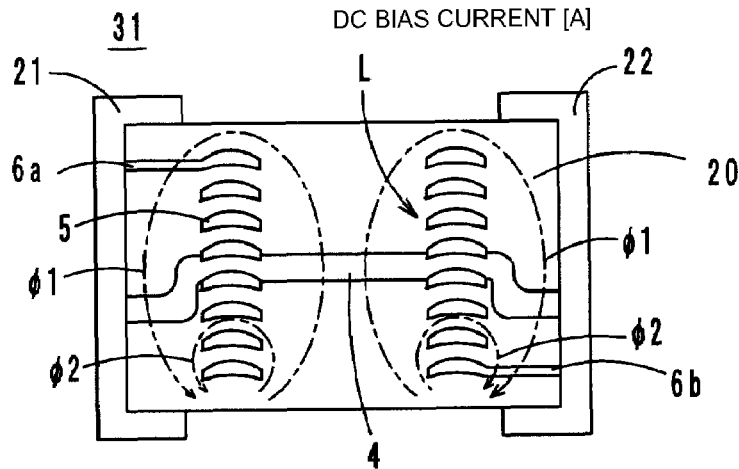
FIG. 10 is a sectional structural diagram of a section including a coil axis of a layered coil component according to a second preferred embodiment of the present invention.

The inventors of the present invention conducted analysis by using a computer in order to confirm the effects of the layered coil component 1. Specifically, a model shown in FIG. 7 was assumed as a model of the layered coil component 1, a model shown in FIG. 8 was assumed as a model of the layered coil component 101 of Comparative example (known example), and the relationship between the DC bias current and the rate of change in inductance was simulated for each case. FIG. 9 is a graph showing the relationship between the DC bias current and the rate of change in inductance, the horizontal axis indicates a magnitude of the DC bias current, and the vertical axis indicates the rate of change in inductance.

Figure 7:
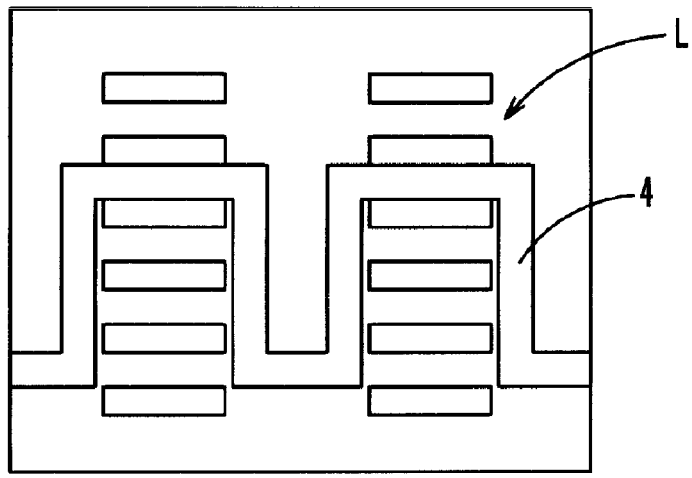
FIG. 7 is a sectional structural diagram of an analytic model of the layered coil component according to the first preferred embodiment of the present invention.

The analytical condition will be described. In the model, as shown in FIG. 7, of the layered coil component 1, 8.5 turns of coil L constructed by electrically connecting a plurality of coil conductor patterns 5, each having the number of turns of three-quarters of a turn, was used, the thickness of the coil conductor pattern 5 was about 20 µm, the thickness of the third ceramic sheet 4 was about 35 µm, the thickness between the coil conductor patterns 5 was about 14 µm, and the dimension of the chip was approximately 2.0 mm×1.2 mm×1.2 mm. In the model, as shown in FIG. 8, of Comparative example 1, 8.5 turns of coil L constructed by electrically connecting a plurality of coil conductor patterns 5, each having the number of turns of three-quarters of a turn, was used, the thickness of the coil conductor pattern 5 was about 20 µm, the thickness of the third ceramic sheet 4 was about 35 µm, the thickness between the coil conductor patterns 5 was about 14 µm, and the dimension of the chip was approximately 2.0 mm×1.2 mm×1.2 mm. Furthermore, in the model, as shown in FIG. 8, of Comparative example 2, 8.5 turns of coil L constructed by electrically connecting a plurality of coil conductor patterns 5, each having the number of turns of three-quarters of a turn, was used, the thickness of the coil conductor pattern 5 was about 20 µm, the thickness of the third ceramic sheet 4 was about 55 µm, the thickness between the coil conductor patterns 5 was about 14 µm, and the dimension of the chip was approximately 2.0 mm×1.2 mm×1.2 mm.

According to the graph as shown in FIG. 9, it can be understood that the rate of decrease in inductance of the model of the layered coil component 1 is smaller than those of the model of Comparative example 1 and the model of Comparative example 2. Consequently, it can be understood that the DC bias characteristics of the layered coil component 1 are superior to those of the known layered coil component 101.

In the layered coil component 1, the coil conductor patterns 5 are bent. When the coil conductor patterns 5 are bent, as described above, the magnetic resistance in the periphery of the coil conductor pattern 5 is increased and, thereby, a magnetic flux that goes around the entire coil L tends to be generated as compared with a magnetic flux that goes around each of the coil conductor patterns 5. That is, an open magnetic circuit, such as the magnetic path $\phi1$, is formed easily as compared with a closed magnetic circuit, such as the magnetic path $\phi2$. As a result, with respect to the layered coil component 1, an occurrence of magnetic saturation is prevented and the DC bias characteristics are improved.

Second Preferred Embodiment

With respect to the layered coil component 1, as shown in FIG. 6, in a section including the coil axis, the third ceramic sheet 4 is protruded upward in the layering direction in two regions so as to straddle the coil conductor patterns 5. However, the shape of the third ceramic sheet 4 is not limited to this. In the second preferred embodiment, as in a layered coil component 31 shown in FIG. 10, the third ceramic sheet 4 may be protruded upward in the layering direction in one region so as to straddle the coil conductor patterns 5 arrayed in two rows collectively. However, it is preferable that the third ceramic sheet 4 straddles the coil conductor patterns 5 in two separate regions as in the layered coil component 1 rather than that the third ceramic sheet 4 straddles the coil conductor patterns 5 in one region collectively as in the layered coil component 31. The periphery of the straddled coil conductor patterns 5 is widely covered by the third ceramic sheet 4 in the layered coil component 1 as compared with that in the layered coil component 31. As a result, the coil conductor patterns 5 contributing to the formation of the magnetic path φ2 can be reduced in the layered coil component 1 as compared with that in the layered coil component 31 and, therefore, the DC bias characteristics can be improved.

Third Preferred Embodiment

Figure 11:
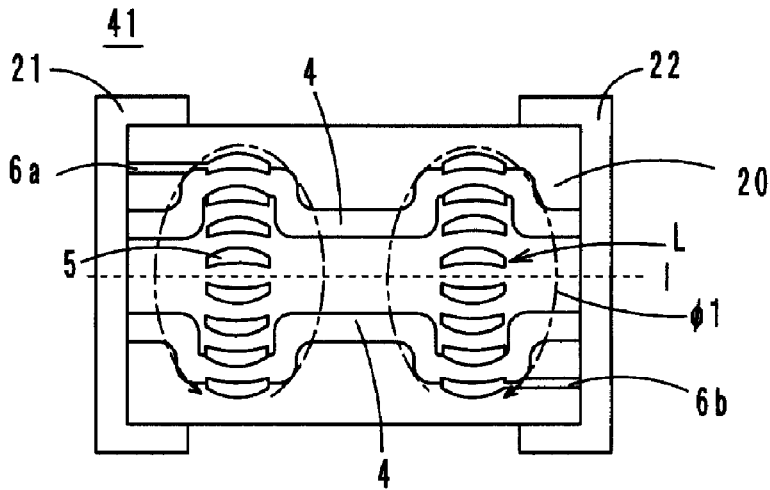
FIG. 11 is a sectional structural diagram of a section including a coil axis of a layered coil component according to a third preferred embodiment of the present invention.

FIG. 11 is a diagram showing the sectional structure of a layered coil component 41 according to the third preferred embodiment. The layered coil component 41 is different from the layered coil component 1 in that two layers of third ceramic sheet 4 are included and the structure is nearly symmetric with respect to a line 1 crossing the center in the layering direction. The explanation will be provided below with a particular emphasis on the differences.

As shown in FIG. 11, in the region below the line 1 in the layered coil component 41, the third ceramic sheet 4 is protruded downward in the layering direction so as to straddle coil conductor patterns 5. Furthermore, in the region below the line 1, the coil conductor patterns 5 are bent so as to protrude downward similarly to the third ceramic sheet 4.

On the other hand, in the region above the line 1, the third ceramic sheet 4 is protruded upward in the layering direction so as to straddle coil conductor patterns 5. Furthermore, in the region above the line 1, the coil conductor patterns 5 are bent so as to protrude upward similarly to the third ceramic sheet 4.

According to the layered coil component 41 having the above-described configuration, the coil conductor pattern 5 located at an uppermost position in the layering direction has a bent structure protruding upward, and the coil conductor pattern 5 located at a lowermost position in the layering direction has a bent structure protruded downward. Consequently, the layered coil component 41 has a structure in which the corners of the coil conductor pattern 5 located at the uppermost position and the corners of the coil conductor pattern 5 located at the lowermost position are rounded. Therefore, with respect to the layered coil component 41, since the magnetic path φ1 can pass the portions where the corners of the coil conductor pattern 5 were present originally, the length of the magnetic path φ1 is decreased as compared with that of the layered coil component 1. As a result, the magnetic flux of the layered coil component 41 can be increased and the inductance of the layered coil component 41 can be increased.

A method for manufacturing the layered coil component 41, as shown in FIG. 11, will be described below. There are differences between the method for manufacturing the layered coil component 41 and the method for manufacturing the layered coil component 1 in that a second ceramic sheet 3 that is softer than the second ceramic sheet 3 of the layered coil component 1 is used in the layered coil component 41.

In the case where the above-described soft second ceramic sheet 3 is used, the coil conductor pattern 5 located at the lowermost position is sunk into the second ceramic sheet 3 located thereunder during press bonding. Since the coil conductor pattern 5 has the shape in which the center portion is the thickest and both end portions are thin, both the end portions tend to be deformed as compared with the center portion. Therefore, in the case where the coil conductor pattern 5 located at the lowermost position is applied with a repulsive force by the second ceramic sheet 3, both the end portions of the coil conductor pattern 5 are deformed so as to warp upward. That is, the coil conductor pattern 5 takes on a shape that is bent in such a way that the center portion is protruded downward. Consequently, each of the coil conductor patterns 5 in the lower half is affected by a layer thereunder and takes on a shape that is bent in such a way that the center portion is protruded in the layering direction as in the coil conductor pattern 5 located at the lowermost position.

On the other hand, in the side above the line 1, the center portion of the coil conductor pattern 5 is applied with a repulsive force during press bonding so as to be pushed upward in the layering direction under the influence of the coil conductor pattern 5 located thereunder, as in the layered coil component 1. As a result, each of the coil conductor patterns 5 in the upper half takes on a shape that is bent in such a way that the center portion is protruded upward in the layering direction.

Fourth Preferred Embodiment

Figure 12:
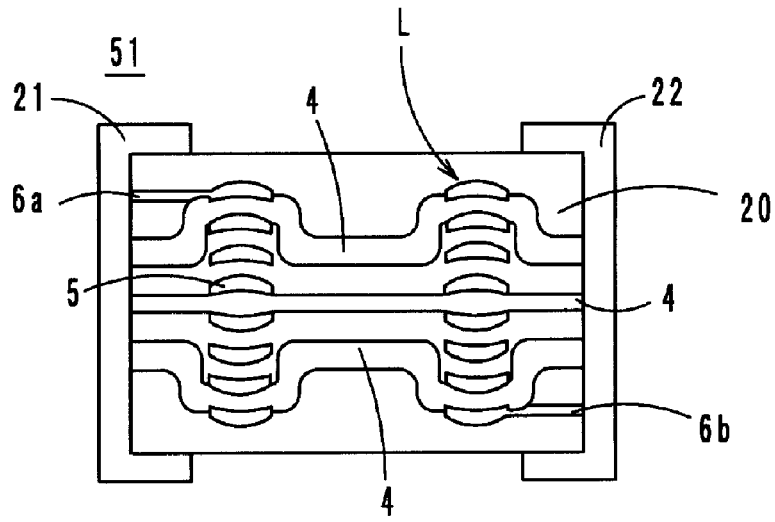
FIG. 12 is a sectional structural diagram of a section including a coil axis of a layered coil component according to a fourth preferred embodiment of the present invention.

As shown in FIG. 12, a layered coil component 51 of the fourth preferred embodiment corresponds to the above-described layered coil component 41 in which another layer of third ceramic sheet 4 is further disposed between the two layers of third ceramic sheets 4 astride the coil conductor patterns 5.

Fifth Preferred Embodiment

Figure 13:
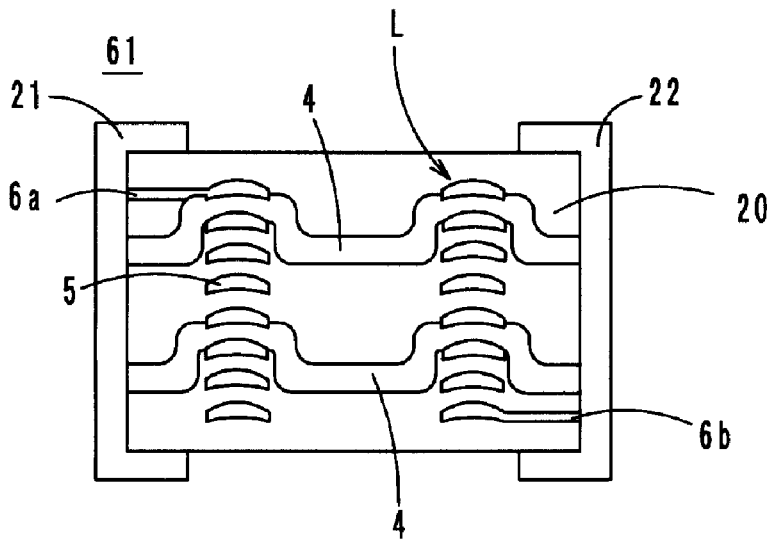
FIG. 13 is a sectional structural diagram of a section including a coil axis of a layered coil component according to a fifth preferred embodiment of the present invention.

As shown in FIG. 13, a layered coil component 61 of the fifth preferred embodiment includes two layers of third ceramic sheets 4 protruded in the same direction. In a method for manufacturing the layered coil component 61, second ceramic sheets 3 having a hardness suitable for preventing the coil conductor pattern 5 from sinking during press bonding is preferably used. According to this preferred embodiment, the coil conductor pattern 5 located at the lowermost position is prevented from sinking into the second ceramic sheet 3. As a result, the coil conductor pattern 5 is prevented from being bent in such a way that the center portion is protruded downward in the layering direction.

OTHER PREFERRED EMBODIMENTS

The layered coil component and the manufacturing method therefor according to the present invention are not limited to the above-described preferred embodiments, and modification can be performed within the bounds of the gist of the invention.

For example, in the above-described preferred embodiments, the layered coil component incorporated with only one coil is shown. However, the layered coil component may be incorporated with at least two coils. Furthermore, in addition to the coil, elements, e.g., a capacitor, may be incorporated so as to constitute a composite electronic component.

As described above, the present invention is useful for a layered coil component and a manufacturing method therefor and, in particular, excellent DC bias characteristics are exhibited.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A layered coil component comprising:
   a coil disposed including electrically conductive members and insulating layers layered on each other in a layering direction; wherein
   the insulating layer includes a first insulating layer and a second insulating layer having a permeability lower than the permeability of the first insulating layer;
   in a cross section including a coil axis of the coil, the second insulating layer has an arrangement that is astride at least two of the electrically conductive members adjacent to each other in the layering direction; and
   the second insulating layer is bent at a portion where the second insulating layer is astride the at least two electrically conductive members.

2. The layered coil component according to claim 1, wherein in the cross section including the coil axis, the second insulating layer has an arrangement that is separately astride each of electrically conductive members disposed in two rows in a layering direction.

3. The layered coil component according to claim 2, wherein the second insulating layer is bent at each portion thereof that is separately astride each of the electrically conductive members disposed in the two rows in the layering direction.

4. The layered coil component according to claim 1, wherein the second insulating layer is a nonmagnetic layer.

5. The layered coil component according to claim 1, wherein at least one of the at least two the electrically conductive members is bent in the same direction as a bending direction of the second insulating layer.

6. The layered coil component according to claim 1, wherein in the cross section including the coil axis, at least one of the at least two electrically conductive members has a shape in which thicknesses of both end portions in a direction that is substantially perpendicular to the coil axis are smaller than a thickness of a center portion.

7. The layered coil component according to claim 1, wherein in insulating layers above a predetermined intermediate layer of the insulating layers, the electrically conductive members are bent so as to protrude toward an upper layer side, and in insulating layers below the predetermined intermediate layer of the insulating layers, the electrically conductive members are bent so as to protrude toward a lower layer side.

8. The layered coil component according to claim 1, wherein a plurality of the second insulating layers are provided.

* * * * *